Inventors
Tsuneo Kobayashi
Shunji Namikawa
Toshio Katagiri
By Stevens, Davis, Miller & Mosher
ATTORNEYS

United States Patent Office 3,280,577
Patented Oct. 25, 1966

3,280,577
AUTOMATIC DEFROSTING CONTROL DEVICE
Tsuneo Kobayashi, Hirakata-shi, Shunji Namikawa, Minoo-shi, and Toshio Katagiri, Neyagawa-shi, Japan, assignors to Matsushita Electric Industrial Co., Ltd., Osaka, Japan, a corporation of Japan
Filed Oct. 7, 1964, Ser. No. 402,161
Claims priority, application Japan, Oct. 9, 1963, 38/76,366; Nov. 20, 1963, 38/62,941; Dec. 28, 1963, 38/15; Dec. 28, 1963, 38/48; May 11, 1964, 39/26,485; June 30, 1964, 39/52,508; June 30, 1964, 39/52,509; July 17, 1964, 39/58,105
8 Claims. (Cl. 62—126)

Our invention relates to automatic defrosting control device of refrigerators in general, and more particularly to that for automatically controlling the defrosting means of refrigerator in response to frost conditions of the evaporator thereof.

In general, known defrosting control devices may be classified as follows:

Defrosting operation is started upon manual depression of a button by a person who desires to defrost;

Defrosting operation is automatically started at a predetermined time by use of a timer;

Defrosting operation is automatically started when the compressor has been operated for a predetermined length of time;

Defrosting operation is started automatically when the number of opening and shutting door has reached a predetermined value;

Defrosting operation is stopped and cooling is restarted automatically when the temperature of evaporator has reached a predetermined value;

Defrosting operation is maintained for a predetermined length of time, and then stopped automatically.

In two-temperature refrigerator having freezing box, the operation period of compressor is controlled by use of constant-cut-in thermostat, so that the evaporator may reach a temperature higher than 0° C. for each cooling period, whereby frosting is prevented.

It is to be noted that, in each of these systems, except the first-mentioned manual control, as well as the last-mentioned one, defrosting operation is started without positive detection of frost condition but merely on the basis of presumption. Although such presumptions are reasonable in general and have practical correlation with frosting, various external conditions and mode of using the refrigerator are disregarded that would affect the frosting.

Thus, in these known defrosting devices, defrosting operation might be started when the evaporator has not been frosted to the predetermined degree, or might not be started even when the evaporator has been frosted to a detrimental degree. In this case, the internal temperature of refrigerator would frequently rise too much, the heat-exchanging efficiency would be lowered, or the refrigerator would lose its function.

In view of the above-mentioned defaults of known arts, the primary object of our invention is to provide an automatic control of defrosting means for a refrigerator by utilization of photo-electric detection of evaporator frosting for causing electrical change to effect the automatic control.

Another object of the present invention is to provide an automatic control system of defrosting means of the kind specified, which comprises a photo-sensitive member consisting of photo-conductor, such as cadmium sulfide, lead sulfide, cadmium telluride, or other chemical compound of semi-conductor, disposed near to the evaporator of a refrigerator for allowing frosting of the photo-sensitive member, a light source disposed in opposition to the light-receiving face of the photo-sensitive member which receives light through the frosted face to cause current change, and means responsive to such current change for controlling the defrosting apparatus of an evaporator.

Another object of the present invention is to provide an automatic control system of the kind above-specified, in which the photo-conductor is accommodated in a casing having an opening provided with a convex lens through which light is concentrated onto the photo-conductor.

A further object of the present invention is to provide an automatic control system of the kind specified, in which the photo-sensitive member is consisting of photo-conductor and partially-light-transmitting frosting-accelerative plate disposed adjacent the photo-conductor and thermally connected to the evaporator, whereby the photo-conductor will cause the predetermined current change to start defrosting operation when the above-mentioned plate has been frosted to a degree corresponding to the predetermined degree of frosting of the evaporator.

A further object of the present invention is to provide an automatic control system of the kind specified, in which the photo-conductor and the light source are connected together, in series relation, and the current change of the photo-conductor is amplified by a transistor for controlling the defrosting device, whereby the defrosting device is prevented from mis-operation upon fault of the light source.

A still further object of the present invention is to provide an automatic control system of the kind specified, in which a first photo-sensitive member for detecting the frosting and a second photo-sensitive member no affected by frosting are provided, the photo-conductors of both photo-sensitive members being connected together in series, and after the voltage change at the junction point of the two photo-conductors is amplified by a transistor, the defrosting device is controlled thereby, whereby the defrosting device is prevented from mis-operation due to variation of the source voltage.

A still further object of the present invention is to provide an automatic control system of the kind specified, in which means are provided for controlling the defrosting device after the current change in the photo-conductor is amplified by a transistor, and for extending the defrosting period by applying a bias voltage different from normal bias voltage to the transistor when the defrosting operation is started, while the first-mentioned bias voltage is removed at the end of defrosting operation.

There are other objects and particularities of our invention, which will be made obvious from the following detailed description of the invention, with reference to the accompanying drawings, in which.

Figure 1:
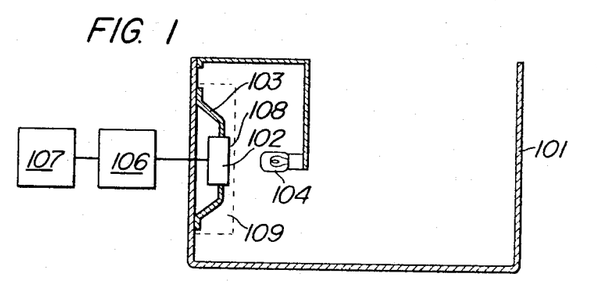
FIG. 1 is a diagrammatic view, partly in mechanical cross-section and partly in electrical schematic, of an evaporator and associated parts of refrigerator embodying the present invention.
Figure 2:
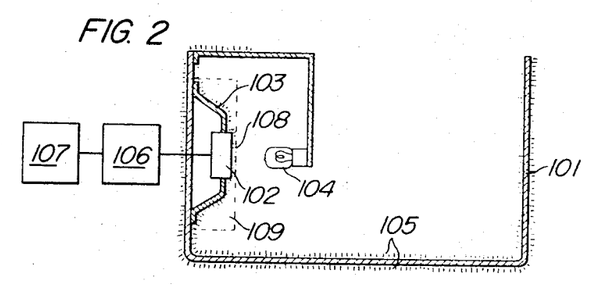
FIG. 2 is a similar view showing the frosted state of the evaporator and associated parts.

The embodiment shown in FIGS. 1 and 2 comprises a photo-sensitive member 109 attached to an evaporator 101, and a light source 104 disposed in opposition to the light receiving face 108 of photo-sensitive member 109. The photosensitive member 109 provided with the evaporator 101 is constructed by a photo-conductor 102 and its supports 103. The electrical output of photo-conductor 102 is applied to an electrical control circuit 106 which controls the operation of defrosting device 107. The photoconductor 102 is formed by cadmium sulfide, for example, which responds to the light received from the light source 104 through the frosted portion of light receiving face 108 for causing change in electrical conductivity, current change caused thereby being applied to the control circuit 106 for producing drive signals for the defrosting device 107.

During the initial period of cooling operation of the refrigerator, when the evaporator 101 and the light receiving face 108 are not frosted, the light passing through the face 108 from the source 104 is not changed in quantity by frost. Thus, the electrical conductivity of photoconductor 102 is sufficiently large, so that the control circuit 106 shows non-frost state, but does not operate the defrosting device 107. However, when the cooling operation has continued and the evaporator 101 has been frosted, the light receiving face 108 has also been frosted by virtue of its cooling through heat-conductive supports 103. The frosted state is shown in FIG. 2. When it comes to this state, the light amount reaching the photo-conductor 102 proper has been decreased to a predetermined value by virtue of scattering and absorption of light by the frost on light receiving face 108, thereby decreasing the electrical conductivity of photoconductor 102 correspondingly, and sending a signal to the electrical control circuit 106 for starting the defrosting operation of defrosting device 107.

When the defrosting operation is started and the evaporator 101 is being gradually defrosted, the light receiving face 108 is also defrosted correspondingly to increase the light quantity reaching the photo-conductor 102, thereby increasing the electrical conductivity of photo-conductor 102. When the face 108 has been defrosted completely, the control circuit 106 is caused to send a stop signal to the defrosting device 107 to stop the operation thereof, and the refrigerator re-enters into cooling operation.

In the photo-conductor 102, cadmium sulfide, cadmium selenide, cadmium telluride, lead sulfide, zinc sulfide, or the like semi-conductor compounds is used as photo-electric transducer. In place of photo-conductor 102, a photo-transistor formed by a semiconductor, such as silicon, germanium, for example, may be employed for converting change in light received to change in output current, or a photocell may be used for converting change in received light to change in electro-motive force of photocell. The control circuit 106 is prepared to respond to the above-mentioned change in output of photo-sensitive member for applying control signals to the defrosting device.

Figure 3:
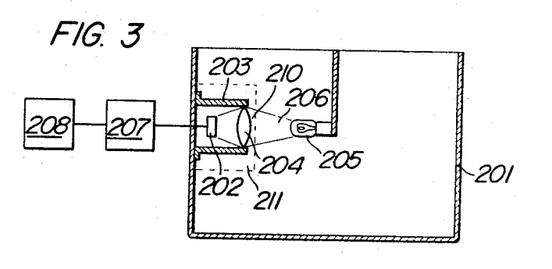
FIG. 3 is a diagrammatic view similar to FIG. 1 showing another embodiment of the present invention.
Figure 4:
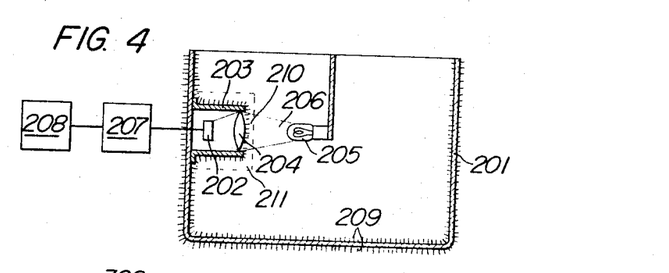
FIG. 4 is a similar view showing the frosted state of the evaporator and others.

In FIGS. 3 and 4, a photo-sensitive member 211 mounted on an evaporator 201 accommodates a photoconductor 202 in a casing 203 having an opening provided with a convex lens 204 having light receiving face 210 in opposition to a light source 205 which is positioned outside the focal point 206 of lens 204. The electrical output of photo-conductor 202 is connected to an electrical control circuit 207 which, in turn, supplies control signals to a defrosting device 208.

In cooling operation of the refrigerator when the evaporator 201 and light receiving face 210 are not frosted, the electric conductivity of photo-conductor 202 is sufficiently high, so that the control circuit 207 indicates non-frosted state and the defrosting device 208 does not operate. When, however, the evaporator 201 and light receiving face 210 have been frosted to a predetermined degree as shown in FIG. 4, the light quantity reaching the photo-conductor 202 through the lens 204 is decreased by scattering and absorption by virtue of the frost on light receiving face 210, and the electro-conductivity of photoconductor 202 is decreased correspondingly, whereby the control circuit 207 is operated to send a defrosting signal to the defrosting device 208 for starting its operation.

The defrosting operation is continued, until the evaporator 201 has been defrosted completely, at which time the light receiving face 210 has also been defrosted completely. Then, the photo-conductor 202 receives light normally, to recover its high conductivity, whereupon the control circuit 207 sends a stop signal to the defrosting device 208 and to operate the defrosting device. The convex lens 204 serves to concentrate light effectively onto the photo-conductor 202, even if the light source 205 is relatively weak and remote from the photo-conductor 202.

When the light receiving face 210 is made relatively large by use of a larger-size lens 204, frosting surface will also be made larger, with increased light scattering and absorption effect, whereby the light flux change will be amplified. By such means, relatively a small light source may be used for accomplishing the result, with least heat generation due to the light source within the refrigerator.

Figure 5:
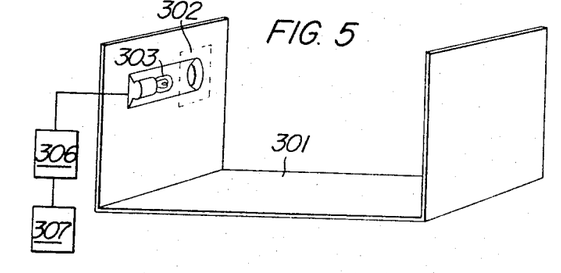
FIG. 5 is a diagrammatic view of another embodiment of the present invention, partly in mechanical perspective and partly in electrical schematic.
Figure 6:
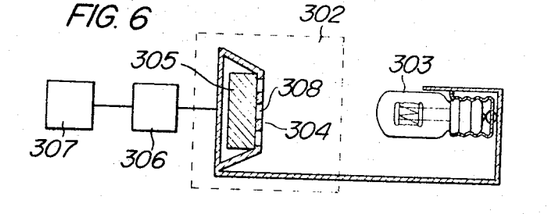
FIG. 6 shows the photo-sensitive member and light source shown in FIG. 5 in mechanical cross-section, with electric control means shown schematically.
Figures 7A, 7B:
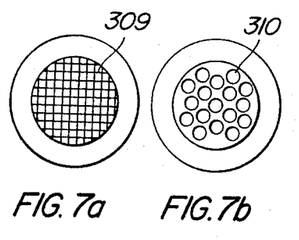
FIG. 7a–d shows some examples of the frosting accelerative plate in FIG. 6.
Figure 7C:
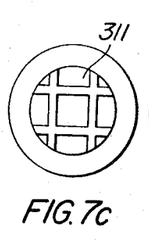
Figure 7D:
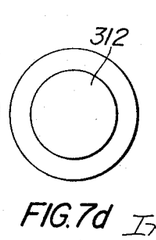

Referring to FIGS. 5 to 7, a photo-sensitive member 302 provided on an evaporator 301 comprises a photoconductor 305, a frosting accelerative plate 308, and their caking, and a light source 303 is disposed in opposition to the light receiving face 304 of photo-sensitive member 302.

The electrical output of photo-conductor 305 is applied to an electrical control circuit 306, which, in turn, supplies control signals to a defrosting device 307, as in the foregoing embodiments shown in FIGS. 1 to 4. The frosting accelerative plate 308 forming a part of photo-sensitive member 302 is made of metal and may take any of four forms shown in FIG. 7, that is, a mesh-like plate 309, a perforated plate 310, a grid-like plate 311, and a translucent plate 312, which partly pass light therethrough.

In operation of the embodiment, shown in FIGS. 5 to 7 employing the frosting accelerative plate 308, when the light receiving face 304 has been frosted to a predetermined degree, the electro-conductivity of photo-conductor 305 is decreased to start defrosting operation, which is stopped when the face 304 has been defrosted. The frosting accelerative plate 308 is a metallic plate partly transmittive to light, and provided in order to compensate for poor heat conductivity of light receiving face 304 by virtue of the material of photo-sensitive member 302 that is formed by glass or other poor heat-conductive material. The plate 308 serves to lower the temperature of light receiving face 304 to that of the evaporator promptly. As a result, even when the external temperature is relatively high, or the refrigerator door is opened frequently, the light receiving face 304 is kept frosted to a degree corresponding to the degree of frosting on the evaporator.

Figure 8:
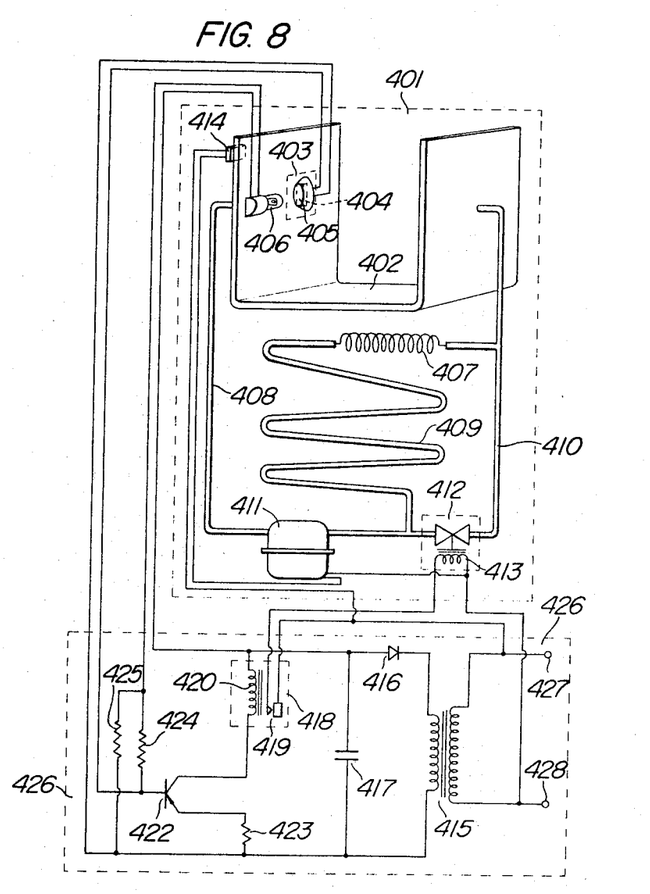
FIG. 8 is a diagrammatic view; partly in mechanical perspective, and partly in electrical schematic, of a refrigerator embodying the present invention.

Referring now to FIG. 8, the refrigerator shown 401 has internal volume of 3.5 cu. ft., and comprises an evaporator 402 of 400 sq. in-surface area. A motor-driven compressor 411 of 65 w.-input compresses refrigerant for feeding the same to evaporator 402 through condenser 409 and capillary tube 407. The refrigerant having passed through evaporator 402 returns to compressor 411 through suction pipe 408.

A photo-sensitive member 403 mounted on a side wall of evaporator 402 comprises a photo-conductor 404 of cadmium sulfide having diameter of one inch. The photoconductor 404 has a light receiving face 405, in opposition to which is disposed a light source 406 comprising a 0.8 watt electric lamp. The electrical output of photoconductor 404 is applied to an electrical control circuit 426 which controls a defrosting device comprising an electro-magnetic valve 412 and a by-pass tube 410.

The control circuit 426 comprises a transistor amplifying circuit consisting of a PNP transistor 422, resistors 423, 424, 425, and a relay 418, and a supply circuit consisting of commercial A.C. electrical source terminals 427, 428, a power transformer 415, a selenic rectifier 416, and a smoothing capacitor 417. The light source 406 is connected between the joint point of resistors 424 and 425 connected between the base of transistor 422 and the positive terminal of supply source, and the negative terminal of supply source. The output terminals of photo-conductor 404 are connected between the base of transistor 422 and the positive terminal of supply source. The resistor 423 is connected between the emitter of transistor 422 and the positive terminal of supply source, and the actuating coil 420 of relay 418 is connected between the collector of transistor 422 and the negative terminal of supply source. The operating solenoid 413 of valve 412 is connected across A.C. supply terminals 427 and 428 through contacts 419 of relay 418. The A.C. supply is of 60 cycles-117 volts. The motor input terminals of compressor 411 is connected across A.C. terminals 427 and 428 through a thermostat 414.

Various elements forming the control circuit are rated as follows:

| | |
|---|---|
| Transistor 422 | 2SB176. |
| Photo-conductor 404 | 5 $\rho$r.–18 a. |
| Resistor 423 | 80 Ω. |
| Resistor 424 | 500 Ω. |
| Resistor 425 | 20 Ω. |
| Capacitor 417 | 100 μf. |
| Selenic rectifier 416 | 100 ma.–25 v. |
| Source transformer 415 | Input: 5 va. Output: 12 v.–2 a. |

When A.C. supply terminals 427 and 428 are connected to commercial supply of 60 cycles-117 volts for starting operation of the refrigerator, the light receiving face 405 of photo-conductor 404 receives light of about 30 luxes from the light source 406, and the photo-conductor 404 has a sufficiently high electrical conductivity, so that the voltage between base and emitter of transistor 422 is low, and the relay coil 420 connected to collector of transistor 422 receives about 6 ma./current. This current cannot close the relay contacts 419. Because of this, the electro-magnetic valve 412 is kept closed, and the refrigerant from compressor 411 flows through the normal path for effecting cooling. When the light receiving face 405 of photo-sensitive member 403 has been frosted to average thickness of frost of 0.3 inch, the light reaching photo-conductor 404 decreases to about 10 luxes, thereby decreasing electric conductivity of photo-conductor 404 to raise the base-emitter voltage of transistor, and the collector current of the latter is increased to about 12 ma. The relay 418 is energized by this current to close contacts 419, and the electro-magnetic valve 412 is opened. Whereupon, the defrosting operation is started. Thus, the high-temperature refrigerant from compressor 411 flows through the valve 412 and by-pass tube 410 of less resistance than the cooling cycle path including capillary tube 407, for heating the evaporator 402, as well as the light receiving face 405 of photo-sensitive member 403, to defrost them.

When the defrosting operation has proceeded to a sufficient degree, and the electric conductivity of photo-conductor 404 has been recovered to normal, the base-emitter voltage of transistor 422, and consequently, the collector current of the latter is decreased for deenergizing the relay 418 to open its contacts 419. The electro-magnetic valve 412 is thus closed. Thus, the defrosting operation is stopped and the cooling operation of the refrigerator is re-started. In case when the light source 406 is deenergized, say by fault, the current flowing through resistor 424 becomes zero, and consequently, the base voltage of transistor 422 falls to zero. The collector current of transistor 422 thus becomes zero, and relay 418 is deenergized with electro-magnetic valve 412 closed, and the defrosting operation cannot be effected.

Figure 9:
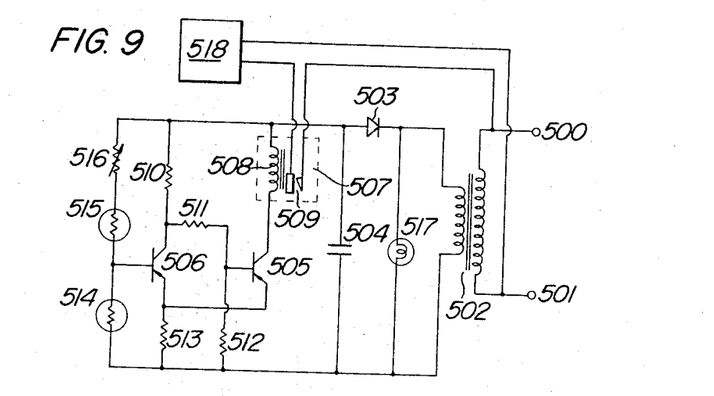
FIGS. 9 and 10 show other examples of electrical control circuit, respectively.

FIG. 9 shows another example of the electric control circuit. It comprises supply terminals 500 and 501, across which is to be connected commercial A.C. supply line, not shown, and is connected the primary winding of a transformer 502 for producing secondary voltage adapted for the transistor circuit to be described. A rectifier 503 and a capacitor 504 are connected in series relation across the secondary winding of transformer 502, and D.C. voltage appears across the capacitor 504. Two switching transistors 505 and 506 are connected across the D.C. voltage terminals through suitable resistors and load. The base of transistor 506 is connected to the common joint point of two photo-conductors 514 and 515, which are connected across the D.C. terminals in series with a variable resistor 516. The collector of transistor 506 is connected to the negative terminal through a load resistor 510, while the emitter is connected to the positive terminal through a resistor 513. Resistors 511 and 512 connected in series relation are connected between the collector of transistor 506 and the positive terminal for applying a bias voltage to the base of transistor 505.

The collector load of transistor 505 is formed by the actuating coil 508 of a relay 507 having break contacts 509. The emitter of transistor 505 is connected to the emitter of transistor 506. An electric lamp forming the light source 517 for photo-conductors 514 and 515 is connected across the secondary winding of transformer 502, and the relay contacts 509 are connected across the A.C. supply terminals in series with a defrosting device 518.

The photo-conductor 514 is mounted on the evaporator for detecting frosting, while the photo-conductor 515 is disposed far from the evaporator so that it is not frosted. The photo-conductor 515 serves for compensation of source voltage change. By adjustment of variable resistor 516, the thickness of frost may be regulated for starting the defrosting operation.

In normal cooling operation of the refrigerator, when the evaporator is defrosted the light at light source 517 is not decreased at the light receiving face and therefore the electric-conductivity of photo-conductor 514 is maximum, with the base potential of transistor 506 positive with respect to the emitter potential, and there is no collector current. On the other hand, the base potential of transistor 505 is negative with respect to the emitter potential, because of the fact that the current flowing through resistor 510 is so little, with saturating current flowing through the collector and relay winding 508, and the relay contacts 509 are kept open. When the evaporator and the light receiving face of photo-sensitive member are frosted, the electro-conductivity of photo-conductor 514 is so decreased that the base potential of transistor 506 becomes gradually negative with respect to the emitter potential. On the other hand, the current flowing through resistor 510 is also increased. Consequently, the base potential of transistor 505 approaches the emitter potential, with the emitter current and the collector current decreased. As a result, the current flowing though resistor 513 decreases to have the base potential of transistor 506 gone to negative further with respect to the emitter potential, with the collector current of transistor 506 increased to the saturation current. Thus, the collector current of transistor 505 is suddenly interrupted, and the relay contacts 509 are closed to start the operation of defrosting device 518.

As the defrosting operation proceeds and the evaporator and photo-sensitive member are being defrosted, the photo-conductor 514 receives increasing amount of light. As a result, the collector current of transistor 506 decreases to have the base potential of transistor 505 approaching the emitter potential. Upon complete defrosting, the base potential of transistor 505 becomes negative with respect to the emitter potential. With increase of voltage drop across the resistor 513, the collector current of transistor 506 decreases. As a result, the voltage drop across resistor 510 decreases to increase the collector current of transistor 505. At last, the relay 507 is effectively energized to open its contacts 509 to stop the defrosting operation. On the other hand, the collector current of transistor 506 is interrupted. Thus, the refrigerator re-starts the cooling operation.

When the source voltage should vary to change the strength of light source 517, both the photo-conductors 514 and 515 would change their electric conductivities. Consequently, the potential at the common joint point of the two photo-conductors 514 and 515, that is, the base potential of transistor 506 would not change so far, thus the effect of source voltage change being kept minimum advantageously.

Figure 10:
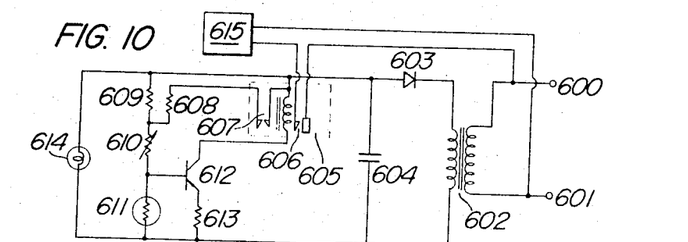

Another example of electric control circuit is shown in FIG. 10, and comprises A.C. supply terminals 600 and 601, and a transformer 602 connected thereacross. The secondary winding of transformer 602 is connected to a series circuit of a rectifier 603 and a capacitor 604, whereby D.C. energy is supplied to the transistor circuit to be described. Across the D.C. supply terminals, a photo-conductor 611, a variable resistor 610, and a resistor 609 are connected in series, with the resistor 609 at the negative side, and the common joint point of photo-conductor 611 and variable resistor 610 is connected to the base of a transistor 612, whose collector is connected to the negative terminal through the actuating coil of a load relay 605, while the emitter is connected to the positive terminal through a resistor 613. Contacts 606 of the relay 605 are connected between A.C. terminals through a defrosting device 615, while relay contacts 607 are connected between the common joint point of resistors 609 and 610 and the negative terminal in series with a resistor 608. A light source 614 for irradiating the photo-conductor 611 is connected direct between the D.C. terminals.

The voltage divided by photo-conductor 611 and resistors 610, 609 provides a first base bias voltage, a second base bias voltage being applied by the increment of base-emitter voltage in the base circuit of transistor 612 when the defrosting device 615 starts its operation with relay contacts 606 and 607 closed and resistors 608 and 609 connected in parallel to the negative terminal. The photo-conductor 611 is attached to the evaporator and is provided with light receiving face capable of being frosted.

Figure 11:
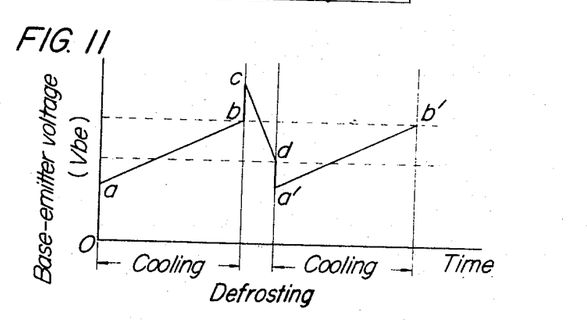
FIG. 11 is a characteristic curve diagram of the circuit shown in FIG. 10.
Figure 12:
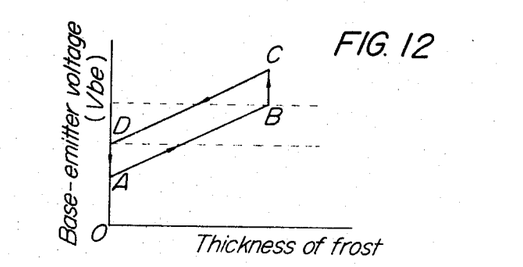
FIG. 12 is another characteristic curve diagram circuit shown in FIG. 10.

Referring to FIG. 11, when the light receiving face of photo-conductor 611 is not frosted, the internal resistance of photo-conductor 611 is so low that the base-emitter voltage of transistor 612 is at point $a$. When the evaporator and the light receiving face of photo-conductor 611 have been frosted to a predetermined degree, the base-emitter voltage rises and reaches point $b$, by virtue of increase in the internal resistance of photo-conductor 611. At this time, the relay 605 is effectively energized to close contacts 606 and 607. Thus, the defrosting device 615 starts to operate, and the resistor 608 is connected in parallel with resistor 609. The second base bias voltage is thus additionally applied to transistor 612, and the base-emitter voltage thereof rises to point $c$. As the defrosting operation proceeds, the photo-conductor 611 receives gradually increasing amount of light, and when the defrosting has been completed, the base-emitter voltage lowers to point $d$, at which the relay 605 is deenergized to open contacts 606 and 607. The defrosting operation is thus stopped, and the next cooling cycle is commenced and proceeds along line $a'-b'$, the drop of base-emitter voltage from $d$ to $a'$ being by virtue of the opening of relay contacts 607. The variation of the base-emitter voltage in relation to the thickness of frost (average value) is shown in FIG. 12, and it is clearly seen therefrom that a good cycling of operation is assured.

The average thickness of frost at which the defrosting operation should be started can be adjusted at will by changing the value of variable resistor 610 whereby the position of point B is varied. In addition, by selecting values of resistors 608 and 609, the magnitude of second base bias voltage may be adjusted, whereby the difference between the energizing and deenergizing current of relay 605 may be compensated for to regulate the state of completion of defrosting, and the defrosting device may be stopped to operate with the evaporator and light receiving face of photo-conductor 611 completely defrosted.

It should be noted that, in place of photo-conductor 611 of cadmium sulfide, lead sulfide, cadmium telluride, or other semi-conductor compound, photo-transistor such as of silicon or germanium may be used.

Figure 13:
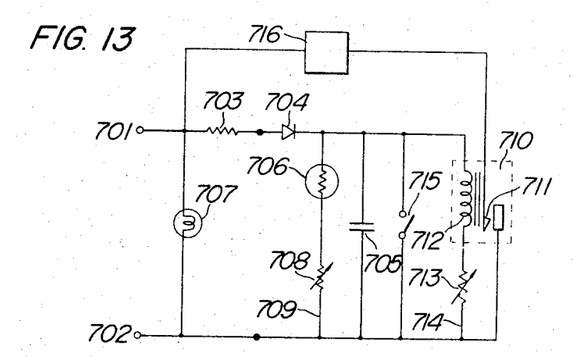
FIG. 13 shows a further example of electric control circuit embodying the present invention.

FIG. 13 shows another example of electric control circuit comprising commercial A.C. supply terminals 701 and 702, across which a light source lamp 707 is connected for irradiating a photo-conductor 706. The photo-conductor 706 is connected across the A.C. supply terminals through a series resistor 703 and a rectifier 704, and is shunted by a wave-form smoothing capacitor 705. A voltage-regulation control resistor 708 is also connected in series with photo-conductor 706. Across the D.C. terminals provided by the rectifier 704 and capacitor 705 are connected the actuating coil 712 of relay 710 and a resistor 713 for compensation of operative range of relay 710. In parallel with this series circuit 714, a thermostat 715 is connected between the D.C. terminals.

The make contacts 711 of relay 710 are connected between A.C. terminals 701 and 702 through a defrosting device 716.

In operation, when the evaporator and light receiving face of photo-sensitive member mounted on the evaporator are not frosted, the photo-conductor 706 is fully irradiated by light from the source 707, and the internal resistance of the former is so low that the resultant resistance of photo-conductor circuit 709 and relay circuit 714 is very low in comparison to the series resistance 703. As a result, the voltage applied on the relay circuit 714 is so low that the relay 710 cannot be effectively energized, with contacts 711 held open. The defrosting device 716 is thus inoperative. The temperature of evaporator being below 0° C., the thermostat 715 is also kept open. The thermostat 715 is attached to the evaporator.

When the cooling operation of refrigerator proceeds and the evaporator and light receiving face of photo sensitive member have been frosted to a predetermined degree, the internal resistance of photo-conductor 706 and consequently the resultant resistance of photo-conductor circuit 709 and relay circuit 714 reaches a predetermined high value. As a result, the voltage applied across the relay circuit 714 becomes sufficiently high for effectively energizing relay 710 to close its contacts 711. The defrosting device 716 is thus energized to operate. As the defrosting operation proceeds, the evaporator temperature rises to close the thermostat 715 at last. Whereupon, no voltage is applied across the relay circuit 714, and the relay contacts 711 are open to terminate the defrosting operation, the refrigerator thus re-starting the cooling cycle. When the evaporator temperature has dropped to a predetermined value, the thermostat 715 is reopened, and the system has returned to the normal condition.

When the A.C. supply voltage should have dropped from normal, the light source 707 would become less brilliant, and the internal resistance of photo-conductor 706 would be increased accordingly. As a result, the resultant resistance of photo-conductor circuit 709 and relay circuit 714 becomes high. Thus, the decrease in A.C. supply voltage is compensated for, and the voltage applied to the relay circuit 714 is maintained substantially unchanged. Similar compensation is also effected when the A.C. supply voltage rises from normal. Such a compensation effect can be expected within A.C. supply voltage regulation of ±15%, in practice.

Figure 14:
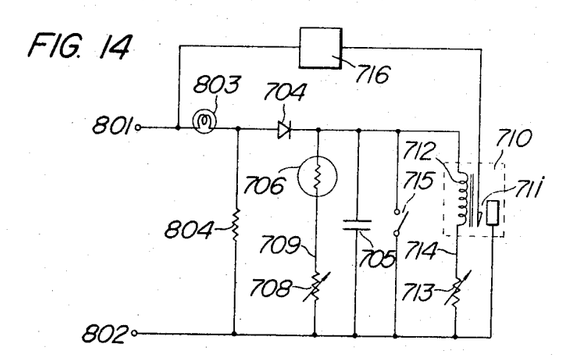
FIG. 14 shows a further example of the same.

FIG. 14 shows a modified form of the control circuit shown in FIG. 13. In this modification, the light source lamp 803 is connected across the A.C. supply terminals 801 and 803 in series with a resistor 804, across which resistor the rectifier 704, photo-conductor 706, and the variable resistor 708 are connected. In parallel with the photo-conductor circuit 709, the capacitor 705, thermostat 715, and the relay circuit 714 are connected. The above-enumerated elements are standardized as follows:

| | |
|---|---|
| Light source lamp 803 | 150 v.–5 w. |
| Shunt resistance 804 | 8KΩ–2 w. type. |
| Rectifier 704 | ma.–203 max. 150 ma.–330 v. |
| Photo-conductor 706 | 5ρr.–18 a. |
| Variable resistor 708 | 2.2KΩ. |
| Capacitor 705 | 100μf. |
| Thermostat 715 | 15° C. in and −3° C. out. |
| Variable resistor 713 | 3KΩ. |
| Relay 710 | Actuating current <8 ma. Holding current 2.5 ma. |

In operation, when the evaporator and light receiving face of photo-sensitive member are not frosted at all, the photo-conductor 706 of cadmium sulfide is irradiated by light of about 20 luxes from the source 803, and the internal resistance of the same is about 1KΩ. Consequently, the resultant resistance of photo-conductor circuit 709 and relay circuit 714 is about 1.7KΩ, and a D.C. voltage of about 21 volts is impressed across the relay circuit 714 to flow about 5.3 ma. current through the relay coil 712. With this current, the relay 710 is not actuated, and the defrosting device 716 does not operate. The evaporator temperature being −18°–0° C., the thermostat 715 attached to the evaporator is maintained open. When the cooling operation of refrigerator has proceeded to have the evaporator and light receiving face of photosensitive member frosted to average thickness of 0.3 inch or so, the internal resistance of photo-conductor 706 reaches about 2KΩ, with the resultant resistance of circuits 709 and 714 increased accordingly, and about 25 D.C. volts are applied across the relay circuit 714 to flow about 6.3 ma. current therethrough, whereby the relay 710 is operated to close its contacts 711, and the defrosting operation is started.

Upon completion of the defrosting, the evaporator temperature begins to rise, and when it reaches about 20° C., the thermostat 715 is closed to short the relay circuit, and the relay 710 is deenergized to open its contacts 711. The defrosting operation is thus stopped, and the refrigerator recovers to its cooling cycle.

In the cooling cycle of refrigerator, when the evaporator temperature is lowered to −3° C., the thermostat 715 is re-opened, and the photo-conductor circuit 709 and relay circuit 714 are returned to normal conditions.

When the A.C. supply voltage should have dropped from normal, the photo-conductor 706 would receive less light to increase its internal resistance. Consequently, the resultant resistance of photo-conductor circuit 709 and relay circuit 714 increases correspondingly, to compensate for the drop in voltage impressed on the relay circuit 714. Similar compensating operation is effected also when the A.C. supply voltage is increased from normal. In practice, for ±15% variation of A.C. supply voltage, the relay coil current can be maintained within ±1.6% change.

When the light source lamp 803 should be deenergized due to broken filament, the relay 710 would be inoperative, but the refrigerator does never lose its cooling function.

It should be noted that our invention is not limited to the embodiments shown, but various changes and modifications are possible within the spirits and scope of the appended claims.

What we claim is:

1. An automatic defrosting control system for an evaporator comprising a photosensitive member mounted on said evaporator, a light-receiving face of said photosensitive member having a frosting accelerative plate so that said light-receiving face may be frosted along with said evaporator, a light source disposed in opposition to said light-receiving face, means for producing electrical changes in response to the light through said light-receiving face due to the irradiation of a photosensitive element of said photosensitive member, and means for controlling a defrosting operation in response to said electrical changes.

2. An automatic defrosting control system for an evaporator comprising, a photo-sensitive member directly mounted on said evaporator subject to frosting on a light receiving face of said member, a light source for irradiating said light receiving face of said photo-sensitive member, said photo-sensitive member including means for producing electrical changes in response to the amount of light passing through said face, said means comprising a photo-conductor selected from a group consisting of cadmium sulfide, lead sulfide, cadmium telluride and other semi-conductor compounds, means responsive to said electrical changes to produce electrical signals, and means responsive to said electrical signals to control defrosting of said evaporator.

3. An automatic defrosting control system for an evaporator comprising a photo-sensitive member mounted on said evaporator, said photo-sensitive member comprising a casing, a photo-conductor in said casing, a convex lens covering an opening in said casing adjacent said photo-conductor, said lens being subject to frosting on the external surface along with the evaporator surfaces, a light source mounted outside the focal point of said lens to irradiate said photo-conductor through said lens, means responsive to the reaction of said photo-conductor to the light through the lens to control a defrosting operation.

4. An automatic defrosting control system for an evaporator, comprising a defrosting means for said evaporator, a photo-sensitive member disposed adjacent to said evaporator and composed of a photo-conductor selected from a group consisting of cadmium sulfide, lead sulfide, cadmium telluride and other semi-conductor compounds, and a light receiving face of said member adapted to be frosted and defrosted along with said evaporator, a light source disposed in opposition to said light receiving face and connected to an electrical supply source through said photo-conductor, said photo-conductor producing electrical changes in response to the light that has passed through said light receiving face from said light source, said electrical changes being representative of the thickness of frost on said light receiving face, a transistor circuit for receiving said electrical change and amplifying the same to obtain output current corresponding to said thickness of frost, and means for controlling the operation of said defrosting means in response to said output current.

5. An automatic defrosting control system for an evaporator, comprising a defrosting means for said evaporator, a first photo-sensitive member disposed adjacent to said evaporator and having a light receiving face adapted to be frosted and defrosted along with said evaporator, a second photo-sensitive member not to be affected by frosting of said evaporator, a light source for irradiating said light receiving face of said first photo-sensitive member and said second photo-sensitive member, each of said first and second photo-sensitive members being composed of a photo-conductor selected from a group consisting of cadmium sulfide, lead sulfide, cadmium telluride, and other semi-conductor compounds, means for obtaining first current change in response to change in light irradiating said first photo-sensitive member through said light receiving face that is being frosted, means for obtaining second current change in response to change in light irradiating said second photo-sensitive member, the two photo-conductors of said first and second photo-sensitive members being connected in series with each other and being energized from an electrical source common with said light source, a transistor circuit for amplifying said first current change, the transistor having its base connected to the common joint point of said two photo-conductors, and means for changing the output current of said transistor circuit to conrol said defrosting means.

6. An automatic defrosting control system for an evaporator, comprising a defrosting means for said evaporator, a photo-sensitive member having a light receiving face disposed adjacent to said evaporator for frosting and defrosting along with said evaporator, a light source disposed in opposition to said light receiving face, means in said photo-sensitive member for obtaining electrical change in response to the light from said light source through said light receiving face, said change corresponding to the thickness of frost thereon, a transistor circuit for receiving said electrical change in the base circuit of a transistor in said circuit, means for applying a first base bias voltage to said base circuit for amplifying operation of said transistor circuit, means for changing the output current of said transistor circuit in response to said electrical change corresponding to change in said thickness of frost on said light receiving face, thereby to control said defrosting means, means for additionally applying a second base bias voltage to said base circuit when said defrosting means has started its defrosting operation, and means for removing said second bias voltage from said base circuit at the time when said defrosting operation has completed.

7. An automatic defrosting control system for an evaporator, comprising a defrosting means for said evaporator, a photo-sensitive member having a light receiving face disposed adjacent to said evaporator for frosting and defrosting along therewith, and consisting of a photo-conductor formed by semi-conductor compound selected from a group of cadmium sulfide, lead sulfide, cadmium telluride and the like, a light source disposed in opposition to said light receiving face, a photo-conductor circuit including said photo-conductor and a resistor for voltage regulation control, means for obtaining current change from said photo-conductor in response to light impinging on the face from said light source through said light receiving face being frosted, a relay circuit consisting of a relay for controlling said defrosting means by virtue of said current change, and a resistor for controlling the operative range of said relay, said photo-conductor circuit and said relay circuit being connected in parallel with each other and to an electric source common with said light source through a fixed resistor, means controlled by said relay for operating said defrosting means, a thermostat connected in parallel with said relay circuit, and means for stopping the defrosting operation of said defrosting means by means of said thermostat at the end of said defrosting operation.

8. An automatic defrosting control system for an evaporator, comprising a defrosting means for said evaporator, a photo-sensitive member having a light receiving face disposed adjacent to said evaporator for frosting and defrosting along therewith, and consisting of a photo-conductor formed by semi-conductor compound selected from a group of cadmium sulfide, lead sulfide, cadmium telluride, and the like, a light source disposed in opposition to said light receiving face, a photo-conductor circuit including said photo-conductor and a resistor for voltage regulation control, means for obtaining current change from said photo-conductor in response to light impinging on the face from said light source through said light receiving face being frosted, a relay circuit consisting of a relay for controlling said defrosting means by virtue of said current change, and a resistor for controlling the operative range of said relay, said photo-conductor circuit and said relay circuit being connected in parallel with each other and to an electric source through an incandescent lamp forming said light source, means controlled by said relay for operating said defrosting means, a thermostat connected in parallel with said relay circuit, and means for stopping the defrosting operation of said defrosting means by means of said thermostat at the end of said defrosting operation.

References Cited by the Examiner
UNITED STATES PATENTS
3,120,108  2/1964  Pansing __________ 62—151 X LLOYD L. KING, *Primary Examiner.*